United States Patent
Ohanian et al.

(10) Patent No.: US 12,476,804 B2
(45) Date of Patent: Nov. 18, 2025

(54) METHOD OF REPLACING A CURRENT KEY IN A SECURITY ELEMENT AND CORRESPONDING SECURITY ELEMENT

(71) Applicant: THALES DIS FRANCE SAS, Meudon (FR)

(72) Inventors: Henri Ohanian, Ceyreste (FR); Nicolas Joubert, Crots (FR); Cyril Barras, Saint-Maximin (FR); Oussama Bouzayane, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 267 days.

(21) Appl. No.: 18/549,959

(22) PCT Filed: Feb. 22, 2022

(86) PCT No.: PCT/EP2022/054330
§ 371 (c)(1),
(2) Date: Sep. 11, 2023

(87) PCT Pub. No.: WO2022/189133
PCT Pub. Date: Sep. 15, 2022

(65) Prior Publication Data
US 2024/0154804 A1 May 9, 2024

(30) Foreign Application Priority Data
Mar. 11, 2021 (EP) .................... 21305298

(51) Int. Cl.
*H04L 29/06* (2006.01)
*H04L 9/08* (2006.01)
(Continued)

(52) U.S. Cl.
CPC ........... *H04L 9/0891* (2013.01); *H04W 12/03* (2021.01); *H04W 12/047* (2021.01)

(58) Field of Classification Search
CPC ......... H04L 9/0891; H04L 9/14; H04L 63/20; H04L 9/32; H04W 12/03; H04W 12/047
See application file for complete search history.

(56) References Cited

U.S. PATENT DOCUMENTS

| | | | |
|---|---|---|---|
| 2013/0159710 A1* | 6/2013 | Khan | H04L 9/0891 713/168 |
| 2018/0293392 A1* | 10/2018 | Tsai | G06F 21/6209 |
| 2018/0331830 A1* | 11/2018 | Jerichow | H04W 12/35 |

FOREIGN PATENT DOCUMENTS

| | | |
|---|---|---|
| EP | 2770768 A2 | 8/2014 |
| WO | 2016207316 A1 | 12/2016 |

OTHER PUBLICATIONS

International Search Report (PCT/ISA/210) and Written Opinion (PCT/ISA/237) mailed on Jul. 14, 2022, by the European Patent Office as the International Searching Authority for current International Application No. PCT/EP2022/054330—[11 pages].

\* cited by examiner

*Primary Examiner* — Longbit Chai

(57) ABSTRACT

The disclosure concerns a method of replacing a current key in a security element co-operating with a terminal in a network operated by a network operator, the method includes trying to decrypt the encrypted message by using the current key; selecting in a table stored in the secure element another key and try to decrypt the encrypted message by using the other key; replacing atomically the current key by the rescue key and do not use the current key anymore, the rescue key replacing the current key and, otherwise, try to decrypt the encrypted message by using another rescue key of the window if such another rescue key exists, until all rescue keys have been selected and used for decrypting the encrypted message and, if none of the rescue keys permit to decrypt the encrypted message, select the (Continued)

blocking key; and blocking the corresponding functionality of the security element.

6 Claims, 2 Drawing Sheets

(51) Int. Cl.
*H04W 12/03* (2021.01)
*H04W 12/047* (2021.01)

METHOD OF REPLACING A CURRENT KEY IN A SECURITY ELEMENT AND CORRESPONDING SECURITY ELEMENT

FIELD OF USE

The present invention relates to telecommunication and in particular to the authentication of a security element cooperating with a terminal, like for example in a 2G (GSM), 3G (UMTS), 4G (LTE), 5G, IMS or CDMA network.

BACKGROUND

The security element is typically a SIM or UICC card that can be extracted from the terminal. It can also be a so called eUICC that is embedded (soldered) in the terminal or removable therefrom with difficulty. The terminal is typically a mobile phone, a smartphone, a PDA, . . . .

When connecting to a telecommunication network, a security element has to authenticate itself. The authentication consists in sending, from the security element to the backend infrastructure of the mobile telecommunication network of the operator (the 3GPP or 3GPP2 HLR and the 3GPP AuC for 2G/3G/4G networks, and in the 3GPP2 Ac for CDMA networks), the result of a computation of a challenge sent from the network to the UICC, this challenge being computed thanks to at least an authentication parameter stored in a secure memory of the security element. This result is for example a SRES computed by the A3 algorithm at the level of the security element in a 2G, 3G or 4G network, thanks to a secret key Ki.

The secret key Ki constitutes an authentication parameter and is stored in the security element during the personalization stage of this security element, for example in a building of the manufacturer of the security element (personalization process). The secret key Ki is also sent by this manufacturer to the mobile network operator (MNO), in a so called output file. The output file contains the secret key Ki and other parameters that are used by the MNO to authenticate the security element, in function of the algorithm used by the MNO and the security element for authentication purposes. The MNO stores this output file in his backend infrastructure at subscription provisioning time (the HLR is provisioned with some data comprised in the output file) in order to be able to authenticate the security element when the latter tries to connect to the MNO's network. This mechanism exists in 2G networks that only authenticate the security element but also in 3G, 4G or 5G networks where mutual authentications are realized.

When a security element personalization center delivers a security element to a MNO, an output file is generated in his factories and provided via Internet (through a secured channel) to the MNO. Among many other information, this output file contains the network authentication secrets (IMSI, Ki, . . . ). In the following, we will consider that at least one authentication secret is transmitted to the MNO, this authentication secret being generally hereafter called an authentication parameter.

A problem is that a thief can stole output files by compromising the security of the Internet connection between the security element personalizer and the MNO. The output files can also be stolen at the level of the MNO's network. As soon as an output file has been compromised, then it is possible for the attacker to spy the network exchanges and thus listen to the voice calls or the data exchanges. This leads to a privacy problem and, if the theft is publicly revealed, leads to a churn of MNO at the initiative of the end user who loses his confidence in his MNO.

Such a problem is disclosed in WO 2016/207316 from the same applicant.

SUMMARY

It is there proposed a method of replacing at least one authentication parameter for authenticating a security element co-operating with a terminal, this authentication parameter enabling an authentication system of a mobile network to authenticate the security element, the mobile network being operated by a mobile network operator, this method consisting in:

A—Having an entity store in the security element a first authentication parameter;

B—Having this entity transmit to the mobile network operator the first authentication parameter so that the operator can record it in its authentication system for authenticating the security element;

C—On occurrence of an event, having a remote platform transmit to the security element an indicator informing the security element that it is authorized to replace the first authentication parameter with a second authentication parameter if its authentication fails with the authentication system the next time it attempts to connect to the mobile network;

D—On occurrence of the event, having the entity transmit to the operator a second authentication parameter so as to enable the operator to replace the first authentication parameter by the second authentication parameter in its authentication system;

E—In the event of subsequent failure of the security element to connect to the mobile network and if the indicator is present at the security element, replacing the first authentication parameter with the second authentication parameter at the security element so that the security element can authenticate itself with the mobile network by means of the second authentication parameter.

The problem with this known solution is that at step—C—a remote platform transmits to the security element an indicator informing the security element that it is authorized to replace the first authentication parameter with a second authentication parameter if its authentication fails with the authentication system the next time it attempts to connect to the mobile network. This means that a dedicated APDU has to be transmitted by the remote platform to the security element.

This increases the workload of the remote platform.

The present invention proposes a solution to this problem.

More precisely, the present invention proposes a method of replacing a current key in a security element co-operating with a terminal in a network operated by a network operator, the method comprising:

A—When receiving an encrypted message from a distant platform, trying to decrypt the encrypted message by using the current key;

B—If the current key is not the key used by the distant platform to encrypt the message, selecting in a table stored in the secure element another key and try to decrypt the encrypted message by using the other key, the other key being:

a key called rescue key and being part of a window of the table, the window comprising n rescue keys, with n being >=0, or a key called blocking key if n=0 or if the blocking key has a higher priority than the rescue keys, the blocking key being stored outside the window, C—If n>0 and the rescue key permits to decrypt the encrypted message, replacing atomically the current key by the rescue key and do not use the current key anymore, the rescue key replacing the current key and, otherwise, try to decrypt the encrypted message by using another rescue key of the window if such another rescue key exists, until all rescue keys have been selected and used for decrypting the encrypted message and, if none of the rescue keys permit to decrypt the encrypted message, select the blocking key, D—If the blocking key permits to decrypt the encrypted message, block the corresponding functionality of the security element.

Preferably, the size of the window is defined by the network operator.

Advantageously, the window comprises all rescue keys available in the table.

Alternatively, the window comprises a part of all rescue keys available in the table.

The current key and the rescue keys are preferably each part of keysets.

The invention also concerns a security element co-operating with a terminal in a network operated by a network operator, the security element comprising a processor comprising instructions for:

A—When receiving an encrypted message from a distant platform, trying to decrypt the encrypted message by using the current key;

B—If the current key is not the key used by the distant platform to encrypt the message, selecting in a table stored in the secure element another key and try to decrypt the encrypted message by using the other key, the other key being:
  a key called rescue key and being part of a window of the table, the window comprising n rescue keys, with n being >=0, or
  a key called blocking key if n=0 or if the blocking key has a higher priority than the rescue keys, the blocking key being stored outside the window, C—If n>0 and the rescue key permits to decrypt the encrypted message, replacing atomically the current key by the rescue key and do not use the current key anymore, the rescue key replacing the current key and, otherwise, try to decrypt the encrypted message by using another rescue key of the window if such another rescue key exists, until all rescue keys have been selected and used for decrypting the encrypted message and, if none of the rescue keys permit to decrypt the encrypted message, select the blocking key, D—If the blocking key permits to decrypt the encrypted message, block the corresponding functionality of the security element.

DESCRIPTION OF FIGURES

Other features of the present invention will appear in the description below of a preferred implementation of the invention in view of the figures that represent.

DETAILED DESCRIPTION

Figure 1:
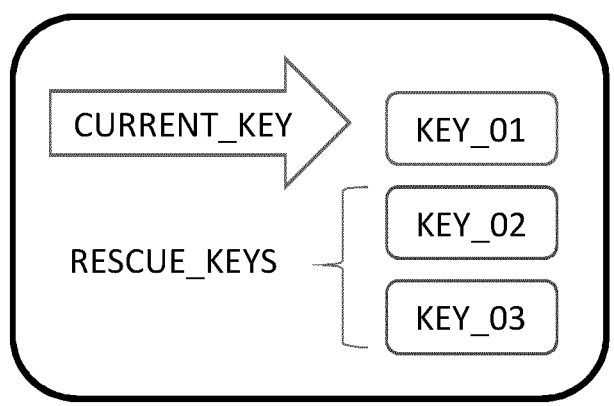
FIG. 1 a simplified file comprised in a security element cooperating with a terminal in a telecommunication network.

FIG. 1 represents a simplified file comprised in a security element cooperating with a terminal in a telecommunication network. This network is operated by a network operator (MNO).

In the file of FIG. 1, different keys KEY_1 to KEY_3 are represented.

Each of these keys are intended to decrypt messages sent by a distant platform. These messages can be messages intended to authenticate the security element or more generally to send commands or responses to a functionality of the security element. Other examples are commands of the type Initialize, Update and/or External auth (on a Secure Domain) used via OTA for initializing the sending of ciphered SMS comprising APDUs to be executed by the security element.

For example, when an encrypted message is sent by the distant platform to the security element, this security element tries to decrypt the received message by using a so called current key (CURRENT_KEY in FIG. 1) KEY_1. If the security element succeeds in decrypting the message, it can answer to the message or perform an action.

In the scope of the invention, the distant platform can decide to encrypt the messages sent to the security element by using another encrypting key. This can happen for example if the current key KEY_1 is considered by the distant platform as being compromised, has been used for encrypting messages for a too long time frame, or for other purposes.

The distant platform then encrypts his messages for this security element with another key, for example KEY_2.

The distant platform comprises the same table than the security element.

In order to be able to decrypt messages that are not encrypted by the current key KEY_1, the security element comprises in a file a plurality of rescue keys (RESCUE_KEYS in FIG. 1) noted KEY_2 and KEY_3 (only two rescue keys in this example).

Figure 2:
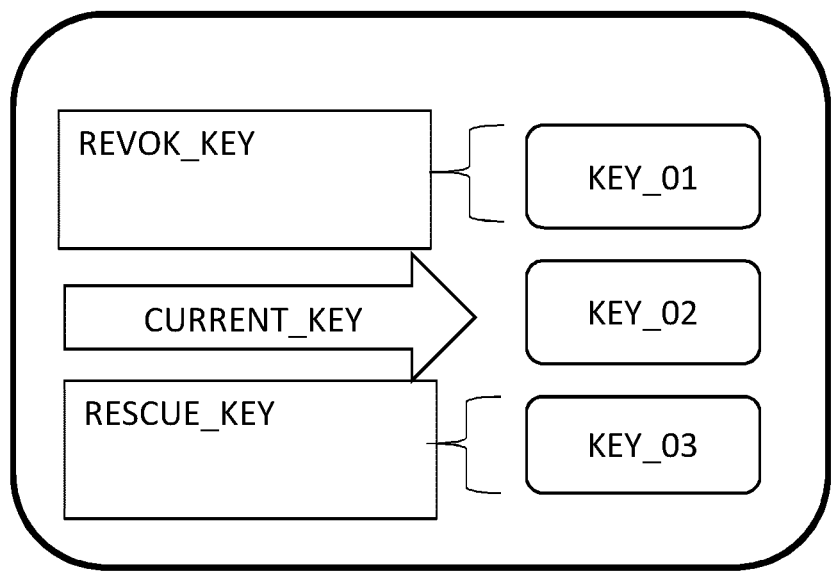
FIG. 2 the simplified file of FIG. 1 once a key has been compromised.

When the security element received an encrypted message, it tries to decrypt it with its current key KEY_1. In case it cannot decrypt the message, the security element, as shown in FIG. 2, tries to decrypt the received message by using the rescue key KEY_2 and if it succeeds to decrypt it revokes KEY_1 and uses KEY_2 as current key. KEY_1 becomes then a revoked key REVOK_KEY, KEY_2 becomes the current key and KEY_3 remains a rescue key RESCUE_KEY.

The replacement of KEY_1 by KEY_2 and the revocation of KEY_1 occurs atomically (no interruption of this process is allowed).

FIGS. 1 and 2 represent the general process of the invention.

Figure 3:
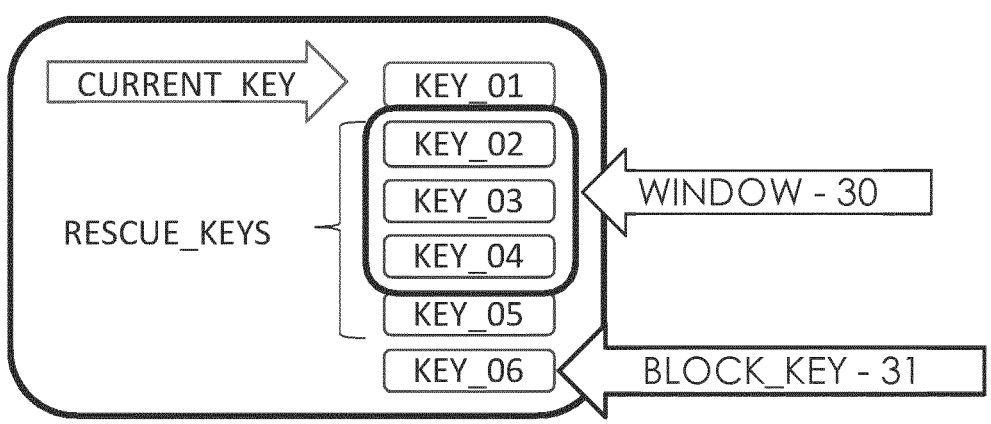
FIG. 3 a table stored in a security element according to the invention.

FIG. 3 represents a table stored in a security element according to the invention. This figure corresponds to a real implementation of the invention.

In this figure, more keys are represented: KEY_4 to KEY_6.

KEY_4 and KEY_5 are rescue keys RESCUE_KEY and KEY_6 is a blocking key BLOCK_KEY. The function of KEY_4 and KEY_5 is the same as KEY_2 and KEY_3 of FIGS. 1 and 2: They are rescue keys (RESCUE_KEY). The BLOCK_KEY KEY_6 (referenced 31) has a special function: It is a key that can block a functionality of the security element. If the distant platform sends a message to the security element that is encrypted by the key KEY_6, and the security element decrypts correctly this message thanks to KEY_6, it blocks the functionality. The blocked functionality corresponds to the functionality addressed by the received message. For example, when trying to make an authentication on a Security Domain or when encrypting an APDU, automatically a functionality is addressed. Thus, the blocking will be done on this functionality. For example, if the distant platform uses an authentication request of a Security Domain by using the blocking key, the functionality of the APDU commands received in this Security Domain will be deactivated.

FIG. 3 also represents a window referenced 30. The size of this window is defined by the security element owner (MNO), for example at the manufacturing stage or later on, by being defined by the MNO by sending instructions via OTA (Over The Air) to the security element to reduce or increase the size of this window 30. There are n RESCUE_KEYS in this window 30, n being >=0 (here n=3). Only the rescue keys comprised in this window 30 will be considered if the current key does not successfully decrypt the received message.

If the secure element does not succeed to decrypt the message sent by the distant platform, it selects in the window 30 a RESCUE_KEY, here the first RESCUE_KEY KEY_02, and tries to decrypt the encrypted message with the KEY_02.

If the message can be decrypted with KEY_02, KEY_02 replaces atomically KEY_01, KEY_02 becomes the current key and KEY_01 will never be used anymore.

If the message cannot be decrypted with KEY_02, KEY_03 is selected for decrypting the message. If the decryption is successful, KEY_02 is revoked and KEY_03 becomes the current key.

If the message cannot be decrypted with KEY_03, KEY_04 is selected for decrypting the message. If the decryption is successful, KEY_03 is revoked and KEY_04 becomes the current key.

Finally, if the message cannot be decrypted with KEY_04, KEY_06 (the BLOCK_KEY) is selected for decrypting the message. If the decryption is successful, the functionality is deactivated definitively. If the decryption is not successful, the card returns crypto error status. Alternatively, the secure element can at first select the BLOCK-KEY KEY_06 if there is no RESCUE_KEYS in the window 30 or if the MNO has decided that the blocking key has a higher priority than said rescue keys comprised in the window 30.

This permits to test first of all if the MNO wants to block a functionality of the secure element before testing rescue keys as explained above.

In FIG. 3, rescue key KEY_05 is not in the window 30. This means that the secure element will not try to decrypt the received message with this key. If one of the keys KEY_02, KEY_03, KEY_04, becomes the current key, then the rescue key KEY_05 can be part of the window for the next time.

To summarize, if the current key is not the key used by the distant platform to encrypt the message, the method of the invention proposes to select in the table stored in the secure element another key and try to decrypt the encrypted message by using this other key, this other key being:
  a rescue key and being part of the window 30 of the table, the window 30 comprising n rescue keys, with n being >=0, or
  the blocking key if n=0 or if the blocking key has a higher priority than the rescue keys, the blocking key being stored outside the window 30, And if n>0 and the rescue key permits to decrypt the encrypted message, the rescue key replaces atomically the rescue key and the current key is not used anymore (revoked), the rescue key replacing the current key. The encrypted message is tried to be decrypted by using successive rescue keys of the window until all rescue keys have been selected and used for decrypting the encrypted message. If none of the rescue keys permit to decrypt the encrypted message, the blocking key is selected and if the blocking key permits to decrypt the encrypted message, the corresponding functionality of the security element is blocked.

As mentioned above, the size of the window 30 can be defined by the network operator, for example at the stage of manufacturing of the secure element or updated via OTA when the secure element is in the field.

In a first alternative, the window 30 comprises all rescue keys available in the table. This means that in regard of FIG. 3, KEY_5 is also comprised in the window 30.

In a second alternative, the window 30 comprises only a part of all rescue keys available in the table (as shown in FIG. 3).

When an asymmetric scheme of encrypting is used, the current key and the rescue keys are each part of keysets.

The invention also concerns a security element co-operating with a terminal in a network operated by a network operator, the security element comprising a processor comprising instructions for:
  A—When receiving an encrypted message from a distant platform, trying to decrypt the encrypted message by using the current key;
  B—If the current key is not the key used by the distant platform to encrypt the message, selecting in a table stored in the secure element another key and try to decrypt the encrypted message by using the other key, the other key being:
    a key called rescue key and being part of a window of the table, the window comprising n rescue keys, with n being >=0, or
    a key called blocking key if n=0 or if the blocking key has a higher priority than the rescue keys, the rescue key being stored outside the window,
  C—If n>0 and the rescue key permits to decrypt the encrypted message, replacing atomically the current key by the rescue key and do not use the current key anymore, the rescue key replacing the current key and, otherwise, try to decrypt the encrypted message by using another rescue key of the window if such another rescue key exists, until all rescue keys have been selected and used for decrypting the encrypted message and, if none of the rescue keys permit to decrypt the encrypted message, select the blocking key,
  D—If the blocking key permits to decrypt the encrypted message, block the corresponding functionality of the security element.

The main advantage of the invention is that it permits to change a key at the level of a secure element without having to send an indicator informing the security element that it is authorized to replace a key by another key. The secure element is autonomous.

The invention claimed is:

1. A method of replacing a current key in a security element co-operating with a terminal in a network operated by a network operator, said method comprising:
  when receiving an encrypted message from a distant platform, first attempting to decrypt said encrypted message by using said current key;

if said current key is not a key used by said distant platform to encrypt said message, selecting from a table, stored in said secure element, another key and subsequently attempting to decrypt said encrypted message by using said another key, wherein said another key being:

a key called a rescue key stored in a part of a window of said table, wherein said window of said table comprising n rescue keys, wherein n is an integer >=0, or a key called a blocking key if n=0 or if said blocking key has a higher priority than said rescue keys, wherein said blocking key being stored outside said window of said table;

if n>0 and said rescue key permits to decrypt said encrypted message, replacing atomically said current key by said rescue key and said current key is no longer used anymore, and wherein it said rescue key replacing said current key fails to decrypt said encrypted message, a process loop is started to decrypt said encrypted message by first using another rescue key from said window of said table when such another rescue key exists and, otherwise, the process loop continues until all rescue keys have been selected and used for decrypting said encrypted message and, if none of said rescue keys permits to decrypt said encrypted message, selecting said blocking key and terminating the or ess loon; and if said blocking key permits to decrypt said encrypted message, blocking a corresponding functionality of said security element.

2. A method according to claim 1, wherein the size of said window is defined by said network operator.

3. A method according to claim 2, wherein said window comprises all rescue keys available in said table.

4. A method according to claim 2, wherein said window comprises a part of all rescue keys available in said table.

5. A method according to claim 1, wherein said current key and said rescue keys are each part of keysets.

6. A security element co-operating with a terminal in a network operated by a network operator, said security element comprising a processor comprising instructions for:

when receiving an encrypted message from a distant platform, first attempting to decrypt said encrypted message by using said current key;

if said current key is not a key used by said distant platform to encrypt said message, selecting from a table, stored in said secure element, another key and subsequently attempting to decrypt said encrypted message by using said another key, wherein said another key being:

a key called a rescue key stored in a part of a window of said table, wherein said window of said table comprising n rescue keys, wherein n is an integer >=0, or a key called a blocking key if n=0 or if said blocking key has a higher priority than said rescue keys, wherein said blocking key being stored outside said window of said table;

if n>0 and said rescue key permits to decrypt said encrypted message, replacing atomically said current key by said rescue key and said current key is no longer used anymore, and wherein it said rescue key replacing said current key fails to decrypt said encrypted message, a process loop is started to decrypt said encrypted message by first using another rescue key from said window of said table when such another rescue key exists and, otherwise, the process loop continues until all rescue keys have been selected and used for decrypting said encrypted message and, if none of said rescue keys permits to decrypt said encrypted message, selecting said blocking key and terminating the process loop; and if said blocking key permits to decrypt said encrypted message, blocking a corresponding functionality of said security element.

\* \* \* \* \*